United States Patent
Lee et al.

(10) Patent No.: US 10,000,141 B2
(45) Date of Patent: Jun. 19, 2018

(54) METHOD AND SYSTEM FOR CONTROLLING FUEL CELL VEHICLE

(71) Applicant: Hyundai Motor Company, Seoul (KR)

(72) Inventors: Kyu Il Lee, Gyeonggi-do (KR); Seon Hak Kim, Gyeonggi-do (KR); Seong Pil Ryu, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 135 days.

(21) Appl. No.: 15/095,252

(22) Filed: Apr. 11, 2016

(65) Prior Publication Data

US 2017/0080822 A1 Mar. 23, 2017

(30) Foreign Application Priority Data

Sep. 18, 2015 (KR) .................. 10-2015-0132321

(51) Int. Cl.
| | |
|---|---|
| B60L 11/18 | (2006.01) |
| B60W 10/26 | (2006.01) |
| B60W 10/28 | (2006.01) |
| B60W 20/00 | (2016.01) |
| B60W 40/09 | (2012.01) |
| H01M 8/04858 | (2016.01) |
| H01M 8/04828 | (2016.01) |

(52) U.S. Cl.
CPC ....... B60L 11/1887 (2013.01); B60L 11/1862 (2013.01); B60W 10/26 (2013.01); B60W 10/28 (2013.01); B60W 20/00 (2013.01); B60W 40/09 (2013.01); H01M 8/0494 (2013.01); H01M 8/04858 (2013.01); B60W 2510/244 (2013.01); B60W 2520/105 (2013.01); B60W 2540/30 (2013.01); B60W 2600/00 (2013.01); B60W 2710/28 (2013.01); H01M 2250/20 (2013.01); Y02T 90/32 (2013.01); Y02T 90/34 (2013.01); Y10S 903/944 (2013.01)

(58) Field of Classification Search
CPC .................................................. B60L 11/1887
See application file for complete search history.

(56) References Cited

U.S. PATENT DOCUMENTS

| | | | | |
|---|---|---|---|---|
| 8,016,061 B2 * | 9/2011 | Jeon | ...................... | B60L 3/0046 180/65.22 |
| 8,511,407 B2 * | 8/2013 | Jeon | ...................... | B60L 3/0046 180/65.265 |
| 9,219,433 B2 * | 12/2015 | Amano | .................. | B60K 6/445 |

(Continued)

FOREIGN PATENT DOCUMENTS

| | | |
|---|---|---|
| JP | 2009-65810 A | 3/2009 |
| JP | 2012-244714 A | 12/2012 |

(Continued)

*Primary Examiner* — Adam D Tissot
*Assistant Examiner* — Michael A Berns
(74) *Attorney, Agent, or Firm* — Mintz Levin Cohn Ferris Glovsky and Popeo, P.C.; Peter F. Corless (57) ABSTRACT

A method and system for controlling a fuel cell vehicle are provided. The method includes determining, by a controller, a driving pattern of a driver based on driving information including acceleration and deceleration information. A condition for activation of an idling-stop of a fuel cell is then set based on the determined driving pattern and the fuel cell is stopped from generating electric energy when the condition for activation of the idling-stop is satisfied.

14 Claims, 2 Drawing Sheets

(56) References Cited

U.S. PATENT DOCUMENTS

| | | | |
|---|---|---|---|
| 2009/0223726 A1* | 9/2009 | Jeon, II | B60L 3/0046 |
| | | | 180/65.25 |
| 2012/0221170 A1* | 8/2012 | Tanoue | B60R 16/0236 |
| | | | 701/1 |
| 2014/0343830 A1* | 11/2014 | Elwart | F02D 41/24 |
| | | | 701/112 |
| 2016/0006059 A1* | 1/2016 | Kwon | B60L 11/18 |
| | | | 429/434 |
| 2016/0006060 A1* | 1/2016 | Kwon | H01M 8/04395 |
| | | | 429/442 |
| 2016/0305388 A1* | 10/2016 | Miller | F02N 11/0818 |

FOREIGN PATENT DOCUMENTS

| | | |
|---|---|---|
| KR | 2010-0005767 A | 1/2010 |
| KR | 2010-0005768 A | 1/2010 |
| KR | 10-2004-0099056 A | 8/2014 |

\* cited by examiner

METHOD AND SYSTEM FOR CONTROLLING FUEL CELL VEHICLE

CROSS REFERENCE TO RELATED APPLICATION

The present application claims priority to Korean Patent Application No. 10-2015-0132321, filed Sep. 18, 2015, the entire contents of which is incorporated herein for all purposes by this reference.

BACKGROUND

Field of the Invention

The present invention relates to a method and system for controlling a fuel cell vehicle, and more particularly, to a method and system that improve fuel efficiency by setting different conditions for activation and deactivation of an idling-stop mode based on a driving pattern.

Description of the Related Art

A fuel cell is a power generating device that converts chemical energy of fuel into electric energy by an electrochemical reaction in a fuel cell stack rather than converting chemical energy into heat through combustion. The energy is used as a power supply device for electronic devices as well as a device to supply electric power to drive vehicles or industrial or household equipment.

When a fuel cell serving as a power supply device for a vehicle is combined with an engine that is typically used in an existing vehicle, it forms a fuel cell hybrid system for a vehicle. The fuel cell hybrid system includes: a fuel cell stack configured to generate electric energy through an electrochemical reaction of a reaction gas; a hydrogen supply device configured to supply the fuel cell stack with hydrogen; an air supply device configured to supply the fuel cell stack with air that contains oxygen serving as an oxidant required for an electrochemical reaction; and a heat-and-water management system configured to discharge byproducts (e.g., heat and water) of the electrochemical reaction to maintain an optimum operation temperature of the fuel cell stack.

A fuel cell hybrid system for a vehicle involves an idling-stop technology that stops a fuel cell from generating electric energy during an idling mode of a vehicle. An avoidance operation for avoiding operation of a fuel cell when a required output power is low is required to improve efficiency and durability of a fuel cell system. Therefore, various technologies to achieve such an avoidance operation have been disclosed in the related art. For example, a control method for activation and deactivation of an idling-stop mode of a fuel cell hybrid vehicle has been developed. This control method of the related art prevents a fuel cell from operating during a low efficiency period, thereby improving fuel efficiency and a system's operation efficiency.

However, this method only involves a method for controlling a vehicle that is in an idling-stop mode or a non-idling-stop mode. In other words, this method is not a technology that is capable of setting different conditions for activation or deactivation of an idling-stop mode based on the state of a vehicle. In particular, activation and deactivation of an idling-stop mode are performed based on fixed criteria, regardless of the state of the vehicle. Therefore, this control method does not reflect various variables such as a driving pattern or a state of a fuel cell when activating or deactivating an idling-stop mode.

The foregoing is intended merely to aid in the understanding of the background of the present invention, and is not intended to mean that the present invention falls within the purview of the related art that is already known to those skilled in the art.

SUMMARY

Accordingly, the present invention provides a system and method for controlling a fuel cell vehicle, the system and method being capable of improving fuel efficiency by setting different conditions for activation and deactivation of an idling-stop, thereby obtaining desired responsiveness of a vehicle.

According to one aspect of the present invention, a method for controlling a fuel cell vehicle may include: determining, by a controller, a driving pattern of a driver based on driving information including acceleration and deceleration information; setting, by the controller, a condition for activation of an idling-stop of a fuel cell based on a driving pattern of a driver determined in the determination of the driving pattern; and stopping, by the controller, the fuel cell from generating electric energy when the condition for activation of the idling-stop is satisfied.

The determination of the driving pattern may include: obtaining, by the controller, an average of speed changes for acceleration driving or deceleration driving; comparing, by the controller, the average with a first reference value that is preset; and determining, by the controller, that the driving pattern is a first driving pattern when the average is greater than the first reference value.

In addition, the determination of the driving pattern may include: obtaining, by the controller, an average of speed changes for acceleration driving or deceleration driving; comparing the average with a first reference value that is preset, by the controller, and a second reference value that is less than the first reference value; and determining, by the controller, that the driving pattern is a first driving pattern when the average is greater than the first reference value, and is a second driving pattern when the average is equal to or less than the first reference value and is greater than the second reference value.

The method for controlling a fuel cell vehicle may further include determining, by the controller, that the driving pattern is a third driving pattern when the average is equal to or less than the second reference value. The determination of the driving pattern may include: obtaining, by the controller, an average of absolute values of speed changes for acceleration and deceleration driving; comparing, by the controller, the average of the absolute values of the speed changes with a first reference value that is preset by the controller; and determining, by the controller, that the driving pattern is a first driving pattern when the average of the absolute values of the speed changes is greater than the first reference value.

Additionally, the method for controlling a fuel cell vehicle may further include performing the following after the obtaining of the average of the absolute values: comparing, by the controller, the average of the absolute values of the speed changes with the first reference value that is preset, by the controller, and a second reference value that is less than the first reference value; and determining, by the controller, that the driving pattern is the first driving pattern when the average of the absolute values of the speed changes is greater than the first reference value, and is a second driving pattern when the average of the absolute values of the speed changes is equal to or less than the first reference value and is greater than the second reference value.

The method for controlling a fuel cell vehicle may include: determining, by the controller, that the driving pattern is a third driving pattern when the average of the absolute values of the speed changes is equal to or less than the second reference value. The method for controlling a fuel cell vehicle may further include: setting, by the controller, a plurality of state of charge (SOC) reference values and a plurality of required torque reference values for a respective driver's driving patterns; and setting, by the controller, a condition in which a current SOC of a battery in a vehicle is greater than an SOC reference value for the driving pattern that is determined and in which a current required torque is less than a required torque reference value for the driving pattern that is determined, as a condition for activation of an idling-stop.

Furthermore, the method may include performing the following after the idling-stop is activated: setting, by the controller, a condition for deactivation of the idling-stop using the determined driving pattern; and deactivating, by the controller, the idling-stop, to cause the fuel cell to generate electric energy when the condition for deactivation of the idling-stop is satisfied. Additionally, a plurality of SOC reference values may be set that correspond to a plurality of driving patterns, wherein the controller may be configured to set a condition in which a current SOC value of a battery is less than an SOC reference value that corresponds to the determined driving pattern, as the condition for deactivation of the idling-stop.

The method for controlling a fuel cell vehicle may further include: setting, by the controller, a plurality of required torque reference values that correspond to a plurality of driving patterns, wherein the controller may be configured to set a condition in which a current required torque of a vehicle is greater than a required torque reference value that corresponds to the determined driving pattern, as the condition for deactivation of the idling-stop. The method for controlling a fuel cell vehicle may further perform the following after the determining of the driver's driving pattern is performed: storing in a memory unit a driving pattern that is determined at the time of turning off an engine; recognizing a restart of a vehicle by determining, by the controller, the driving pattern using driving information including acceleration information or deceleration information of the vehicle after an engine of the vehicle is turned off, then the engine of the vehicle may be restarted, and finally the vehicle may move for a predetermined period of time; and setting a restart by setting, by the controller, a condition for activation of the idling-stop of the vehicle, based on the driving pattern stored in the memory unit when the controller fails to determine the driving pattern in the recognition of the restart.

The method for controlling a fuel cell vehicle may further perform the following after the recognition of the restart is performed: deleting, by the controller, the driving pattern stored in the memory unit by the storing of the driving pattern when the controller completes determination of the driving pattern, wherein in the setting of the restart, the controller may be configured to set the condition for activation of the idling-stop using the driving pattern determined during the recognition of the restart.

According to another aspect, a system for controlling a fuel cell vehicle may include: an acceleration-and-deceleration information acquisition unit configured to acquire acceleration information and deceleration information of a vehicle; and a controller configured to determine a driving pattern of a driver using the acquired acceleration information and deceleration information, set a condition for activation of an idling-stop of a fuel cell using the determined driving pattern, and stop a fuel cell from generating power when the condition for activation of the idling-stop is satisfied.

According to the present invention, the following advantages are obtained.

First, it may be possible to set different operation modes of a fuel cell vehicle by determining a driving pattern of a driver. Therefore, it may be possible to more effectively operate a vehicle based on the driving pattern.

Second, when driving pattern does not involve frequent rapid acceleration, a ratio of an idling-stop mode among operation modes of a vehicle may be increased to improve vehicle's fuel efficiency.

Third, when driving pattern involves frequent rapid acceleration, a ratio of an idling-stop mode is decreased to improve the responsiveness of the vehicle.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referral to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinbelow, an exemplary embodiment of the present invention will be described in detail with reference to the accompanying drawings As described in FIG. 1, a first step of a method for controlling a fuel cell vehicle according to one exemplary embodiment of the present invention determining, by a controller 100, a driving pattern of a driver based on driving information including acceleration and deceleration information of a vehicle (S100). A main object of the present invention is to set different conditions for activation and deactivation of an idling-stop mode of a vehicle based on the driving pattern. The driving pattern is determined in step S100. Details of step S100 to determine driving pattern are described with reference to FIG. 2.

Figure 2:
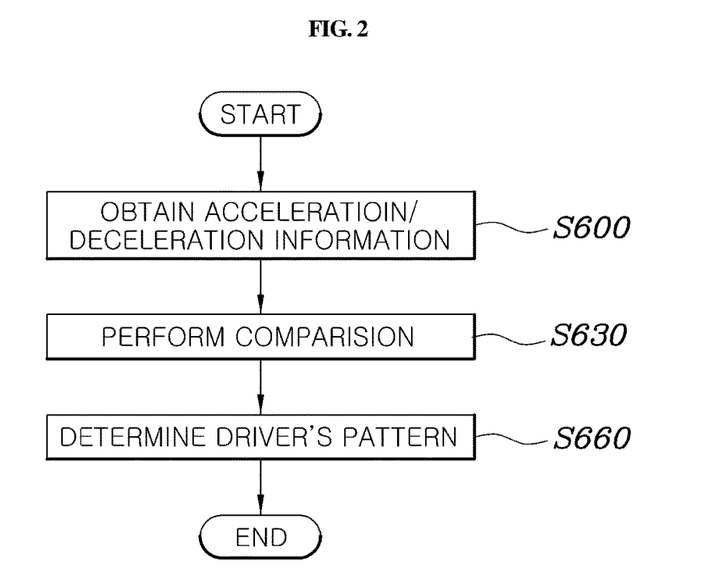
FIG. 2 is a flowchart illustrating a driving pattern determination step according to one exemplary embodiment of the present invention.

The driving pattern of a driver may be determined in various ways. For example, a driver may input information regarding a driving pattern into the controller 100. Alternatively, the driving pattern may be derived from driving information automatically recorded or stored when a driver drives a vehicle. FIG. 2 illustrates a method of deriving driver's driving pattern from driving information. Particularly, the driving information may be acceleration information or deceleration information of a vehicle since acceleration information or deceleration information of a vehicle is a factor used to determine driving habits of a driver. An aggressive driver may show a rapid speed change in driving habits, thereby frequently performing rapid acceleration and rapid deceleration driving (e.g., frequent engagement of acceleration pedal and deceleration pedal). A gentle driver may not show a rapid speed change during driving (e.g., less frequent engagement and disengagement of the acceleration and deceleration pedal).

In particular, the controller 100 may be configured to determine driving habits or a driving pattern of a driver using acceleration information and deceleration information. This method will be described in greater detail below. Specifically, first, the controller 100 may be configured to calculate the average of speed changes for acceleration driving and the average of speed changes for deceleration driving (step S600). Further, the average of speed changes for acceleration driving or the average of speed changes for deceleration driving may be compared with a first reference value that is preset (step S630). When the average of speed changes for acceleration driving or deceleration driving is greater than the first reference value, the controller 100 may be configured to determine the driving pattern to be a first driving pattern (step S660).

The acceleration-and-deceleration information obtaining step S600 may include obtaining the average of speed changes for acceleration driving or deceleration driving of a vehicle. The average of speed changes for acceleration driving or deceleration driving may be obtained in various ways. For example, a sensor configured to detect the speed of a vehicle may be configured to receive acceleration information or deceleration information of a vehicle from the controller 100 and calculate the average of the received values. Alternatively, the controller 100 may be configured to calculate the average of speed changes for acceleration driving or deceleration driving based on an engagement degree of a brake pedal or an accelerator pedal (e.g., the amount of pressure exerted onto an acceleration pedal or a brake pedal).

The average of speed changes for acceleration driving or deceleration driving obtained in step S600 may be compared with the first reference value in step S630. When the average is greater than the first reference value, the driving pattern of the driver may be determined to be the first driving pattern. The first reference value may be determined based on the average of speed changes during acceleration driving or deceleration driving of an aggressive driver. The first reference value may vary based on a vehicle type of vehicle state. Since aggressive drivers frequently perform acceleration driving or deceleration driving, the average of speed changes for acceleration driving or deceleration driving performed by aggressive drivers may be substantial. Therefore, the first reference value for aggressive drivers may be determined to be a large value. For example, the first reference value for these drivers may be set to about 20 kph/s.

When the average of speed changes for acceleration driving or deceleration driving is determined to be greater than the first reference value in step S630, the driving pattern may be determined to be the first driving pattern in step S660. Particularly, the first driving pattern may indicate the driving pattern of aggressive drivers. The first reference value may be a reference value used to determine whether a driver frequently performs rapid acceleration or deceleration. When the average of speed changes executed by a driver exceeds the first reference value, the driver may be considered an aggressive driver.

Further, the average of speed changes for acceleration driving or deceleration driving may be determined to be equal to or less than 1 in step S630. In other words, driving habits a driver may not show frequent acceleration or deceleration. Accordingly, the driving patterns may be further categorized into a gentle driver's driving pattern or an average driver's driving pattern, and thus the control of a fuel cell may be performed based on characteristics of a driver to improve fuel efficiency. In particular, the following control method may be performed.

First, the average of speed changes for acceleration driving or deceleration driving obtained in step S600 may be compared with a first reference value or a second reference value that is less than the first reference value in step S630. When the average of speed changes for acceleration driving or deceleration driving is greater than the first reference value, the controller 100 may be configured to determine that the driving pattern is a first driving pattern. When the average of speed changes for acceleration driving or deceleration driving is equal to or less than the first reference value and is greater than the second reference value, the driving pattern may be determined to be a second driving pattern in step S660. Further, when the average of speed changes for acceleration driving or deceleration driving is equal to or less than the second reference value, the driving pattern may be determined to be a third driving pattern.

Since the overall processing of this method is almost the same as the previous method in which the driver's driving pattern is categorized by comparing only with the first reference value, the same processes will not be repeatedly detailed. The differences between the previous method and the present method will be described. In particular, the second reference value may be a value that is less than the first reference value and may be used to differentiate between gentle drivers and average drivers. The second reference value also may vary based on vehicle type and state of a vehicle as with the first reference value. When the first reference value is set to about 20 kph/s, for example, the second reference value may be set to about 10 kph/s.

Since the driving pattern may be determined to be the second driving pattern when the average of speed changes for acceleration driving or deceleration driving is equal to or less than the first reference value but greater than the second reference value, the second driving pattern may indicate an average driver who is more gentle than aggressive drivers having the first driving pattern (e.g., frequent engagement and disengagement of acceleration and deceleration pedal). When the average of speed changes for acceleration driving or deceleration driving is equal to or less than the second reference value may indicate a driver who rarely performs rapid acceleration or deceleration while driving. Therefore, the driver may be considered a gentle driver. In other words, the third driving pattern may indicate a gentle driver in driving.

Hereinabove, the method of calculating the average of speed changes for acceleration driving or deceleration driving in step S600 and comparing the average with the first reference value and the second reference value has been described. However, another method may be further considered. In other words, a speed change in acceleration driving indicates an increase in speed, and thus a speed change for acceleration driving has a positive value. Conversely, a speed change in deceleration driving indicates a decrease in speed, and thus a speed change for deceleration driving has a negative value. When a vehicle alternately accelerates and decelerates and when the values of speed changes for acceleration driving and deceleration driving are collectively calculated to obtain the average of speed changes, positive values of speed changes for acceleration driving and negative values of speed changes for deceleration driving may be offset, producing a substantially large average value.

Therefore, according to the above-described method, the average of speed changes for acceleration driving and the average of speed changes for deceleration driving may be calculated separately. However, this method makes the control process complicated and may cause errors in control of a fuel cell since the controller 100 is required to perform different processes for acceleration driving and deceleration driving. Accordingly, the present invention proposes a method of determining driver's driving pattern without differentiating between acceleration driving and deceleration driving, and this method is described with reference to step S600 of FIG. 2 in which the average of absolute values of speed changes for acceleration driving and deceleration driving is obtained.

When the values of a speed change for acceleration driving and a speed change for deceleration driving are expressed in absolute values, the values of speed changes for both acceleration driving and deceleration driving are positive. In particular, when the values of speed changes for acceleration driving and the values of speed changes for deceleration driving are collectively calculated to produce an average value, the values of speed changes for acceleration driving and the values of speed changes for deceleration driving may not be offset. Therefore, the process eliminates the need to separately calculate averages for acceleration driving and deceleration driving. In other words, the process is a simplified method of obtaining acceleration and deceleration information that is a criterion to differentiate driver's driving patterns among first to third driving patterns.

Subsequently, according to the present method, the same steps as step S630 (comparison step) and step S660 (driver's driving pattern determination step) are performed as described above. In other words, the obtained average may be compared with a first reference value and a second reference value, and then the driving pattern may be determined to be a first driving pattern, a second driving pattern, or a third driving pattern according to the comparison results. After the driving pattern is determined based on the acceleration-and-deceleration information obtained in any way among the ways described above, a condition for activation of an idling-stop may be set by the controller 100 (S200). Further, power generation of a fuel cell of a vehicle may be stopped by the controller 100 when the condition for activation of an idling-stop of a fuel cell is satisfied (S250).

Figure 1:
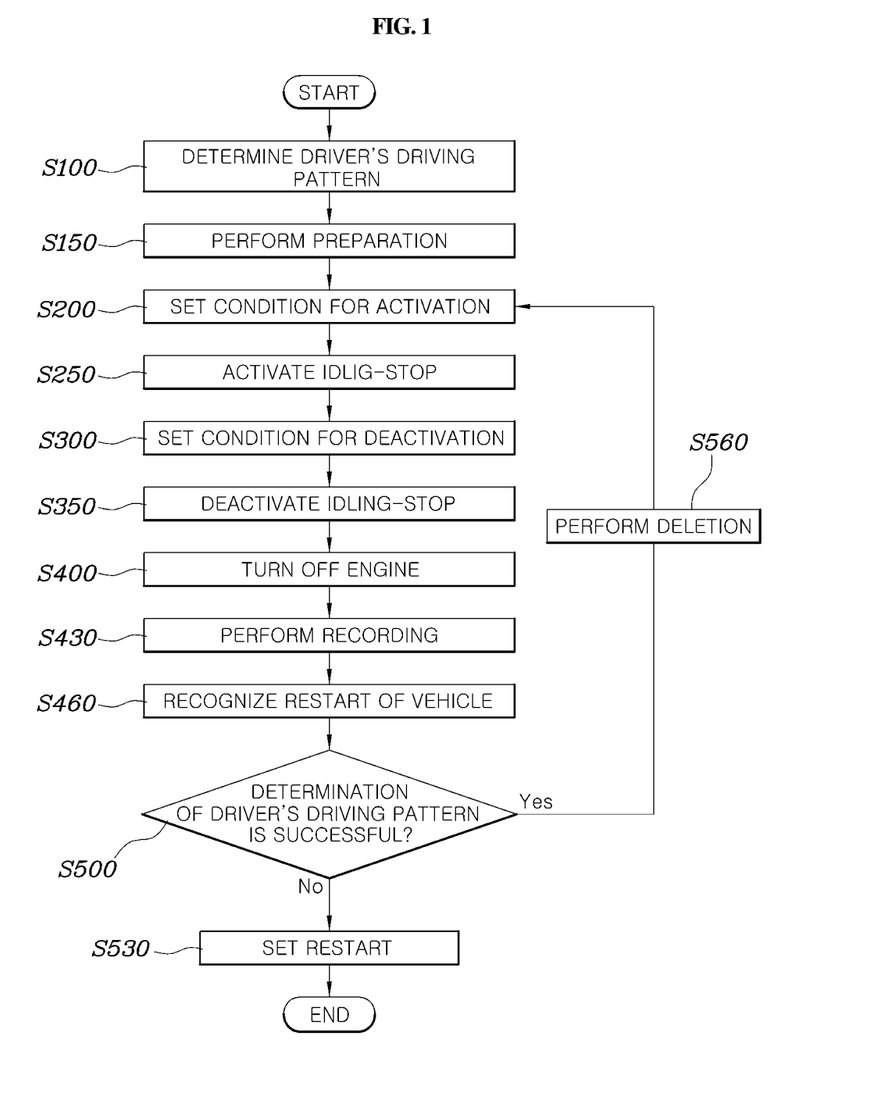
FIG. 1 is a flowchart illustrating a method for controlling a fuel cell vehicle according to one exemplary embodiment of the present invention.

Additionally, a preparation step S150 may be executed between the driver's driving pattern determination step S100 and the idling-stop activation condition setting step S200 as illustrated in FIG. 1. In particular, the preparation step S150 may include setting a reference value for state of charge (SOC) (hereinafter, referred to as SOC reference value) and a reference value for required torque (hereinafter, referred to as "required torque reference value") for each type of driving pattern. In other words, the determined SOC reference values and required torque reference values for the first driving pattern, the second driving pattern, and the third driving pattern may be set in the preparation step S150. The setting of the SOC reference values and the required torque reference values for the driving patterns are factors to determine activation of an idling-stop for a fuel cell vehicle.

An idling-stop is a technology to improve efficiency of a system of a fuel cell vehicle. This technology stops operation of a fuel cell when a demanded output power for a vehicle is insufficient and when a vehicle is driven in electric vehicle (EV) mode. Accordingly, factors to determine activation of an idling-stop include a required torque. Further, the SOC of a high voltage battery may be determined since a high voltage battery may be in a fully discharged state when SOC is excessively low. In this state, a fuel cell is operated to charge the high voltage battery.

Accordingly, SOC reference values and required torque reference values may be set, based on the determined driving patterns, as factors to determine activation of an idling-stop. The SOC reference value and the required torque reference value may vary based on performance and type of vehicle. However, the SOC reference value and the required torque reference value may also be dependent on the determined driving patterns. When the determined driving pattern is an aggressive driver's driving pattern, a ratio of an idling-stop mode may be decreased to improve the responsiveness of the vehicle. In particular, when it is necessary to increase requirements for activation of an idling-stop, the SOC reference value may be set to be high and the required torque reference value may be set to be low. Conversely, when a driver is a gentle driver who gently drives, the SOC reference value is set to be low and the required torque reference value is set to be high.

Moreover, as illustrated in FIG. 1, the idling-stop activation condition setting step S200 may be performed. In particular, when a current SOC of a battery of a vehicle is greater than the SOC reference value that corresponds to the determined driving pattern and when a current required torque of a vehicle is less than the required torque reference value, such ranges of the SOC and the required torque may be set as conditions for activation of an idling-stop.

In other words, the SOC reference value and the required torque reference value may be set as conditions for activation of an idling-stop. Since an idling-stop is activated when a high voltage battery is sufficiently charged and an output power demanded by a driver is sufficiently low, according to the present exemplary embodiment of the invention, conditions for activation of an idling-stop may be set in which a current battery SOC is greater than the SOC reference value and a current required torque reference value is less than the required torque reference value. Further, an idling-stop may be activated when both requirements, the current battery SOC and the current required torque, are satisfied. Therefore, an AND operation between conditions of the SOC reference value and the required torque reference value may be performed to determine whether to activate an idling-stop. In other words, when both requirements, the SOC and the required torque, are satisfied, a vehicle may undergo an idling-stop.

According to the present invention, it may be possible to set a condition for deactivation of an idling-stop according to the driving pattern as well as a condition for activation of an idling-stop according to the driving pattern. Therefore, the present invention aims at improvement of fuel efficiency through improvements in vehicle responsiveness and acceleration performance of a fuel cell vehicle.

The process for setting a condition for deactivation of an idling-stop may include setting, by the controller 100, a condition for deactivation of an idling-stop of a fuel cell based on the driving pattern (S300) and an idling-stop deactivation step S350 in which the controller 100 causes a fuel cell to start power generation when the condition for deactivation of an idling-stop is satisfied.

The idling-stop deactivation condition setting step is almost the same as the idling-stop activation condition setting step except for a method of setting a condition. The deactivation condition setting step may be configured to perform an OR operation between requirements of an SOC and a required torque. Therefore, both of an SOC reference value and a required torque reference value are not required to be set for each driving pattern. In other words, in either case when a high voltage battery requires charge during operation of an idling-stop or whether a demanded output power of a vehicle is high, the idling-stop may be deactivated. Accordingly, the setting of an SOC reference value and the setting of a required torque reference value may be performed separately. However, in the deactivation condition setting step, either the SOC reference value or the required torque reference value may vary based on performance and type of vehicle like the SOC reference value and the required torque reference value that are set in the preparation step of the activation condition setting step. The increase in aggression of a characteristic of a driver may then cause an increase in the SOC reference value and a decrease in the required torque reference value.

When setting a condition for deactivation of an idling-stop using an SOC reference value, an idling-stop deactivation condition may be a condition in which the SOC of a battery is less than the SOC reference value that is set based on the determined driving pattern. When the SOC of the battery is less than the SOC reference value, there is a possibility that a battery is fully discharged. In particular, it may be necessary to release an idling-stop mode to prevent the battery from being fully discharged.

Additionally, when the required torque reference value is used, an idling-stop deactivation condition may be a condition in which the required torque of a vehicle is greater than the required torque reference value set based on the determined driving pattern. In particular, this state may indicate a state in which a driver has an intention to drive on a high driving power. Therefore, it may be necessary to operate a fuel cell to produce the high power, which requires a release of an idling-stop mode. In other words, according to the present invention, it may be possible to adjust the condition for activation or deactivation of an idling-stop based on the driving pattern. Therefore, an aggressive driver may enjoy an advantage of improved responsiveness of a vehicle and a gentle driver may enjoy an advantage of improved fuel efficiency.

When the driving pattern is unable to be determined for some reasons, for example, an operation error of the controller 100, as illustrated in FIG. 1, the following steps may be performed: a driving pattern of the driver that is determined when an engine of a vehicle is turned off may be stored in a memory unit S430); and a driving pattern of the driver may be determined based on driving information including acceleration and deceleration information of a vehicle when the vehicle continuously drives for a predetermined period after the vehicle is restarted (S460).

In particular, the driving pattern determined before an engine is turned off may be stored in the memory unit. As described above, when driving pattern of a driver cannot be determined by the controller 100 when restarting a vehicle, the driving pattern stored in the memory unit may be used. The memory unit may be a dedicated memory that is separately provided from the controller 100 and may be configured to store information regarding the driving pattern of a driver. Alternatively, the memory unit may not be a separate memory unit but may be a memory area provided within the controller 100 since the amount of data of driving pattern is not large.

When driving pattern of the driver determined before turning-off of an engine of a vehicle is stored in the memory unit, the driving pattern may be determined for a predetermined period of time after restarting of the vehicle through the restart recognition step S460. The predetermined period of time required to determine driver's driving pattern may vary based on vehicle type and driving habits. However, according to the present invention, since the driving pattern may be determined based on driving information including information regarding acceleration or deceleration driving of a vehicle, a period of time during which an engine is started and a vehicle does not move yet is not included in the predetermined period of time.

In sufficient time during which driver's driving pattern may be determined by the controller 100 after a vehicle moves, whether the controller 100 succeeded in determining the driving pattern may be determined (S500). In particular, in response to determining a failure of the driving pattern, as illustrated in FIG. 1, a condition for action of an idling-stop may be set based on the driving pattern stored in the memory unit (S530). Accordingly, even though the controller 100 fails in determining the driving pattern after restarting of a vehicle, operation of a vehicle may be appropriately performed based on the driving pattern stored in the memory unit.

When the driving pattern is determined to be successfully determined in step S500, as illustrated in FIG. 1, the driving pattern stored in the memory unit may be deleted in step S560. Further, the activation condition setting step S200 in which a condition for activation of an idling-stop is set based on the driving pattern determined in the restart recognition step may be performed. When the driving pattern is successfully determined, the driving pattern is no longer required to be stored in the memory unit. Therefore, the driver's driving pattern previously determined may be deleted in the deletion step S560. Then, the process may return to the activation condition setting step S200 and the controller 100 may be configured to set conditions for activation and deactivation of an idling-stop based on a newly determined driving pattern of a driver.

As described above, according to the present invention, it may be possible to renew information of a driving pattern at every restart of a vehicle and reflect the updated driving pattern every when setting conditions for activation and deactivation of an idling-stop. Therefore, the operation of a vehicle may be performed in response to the driving pattern constantly changing, thereby providing a driver with a value-added fuel cell vehicle.

Figure 3:
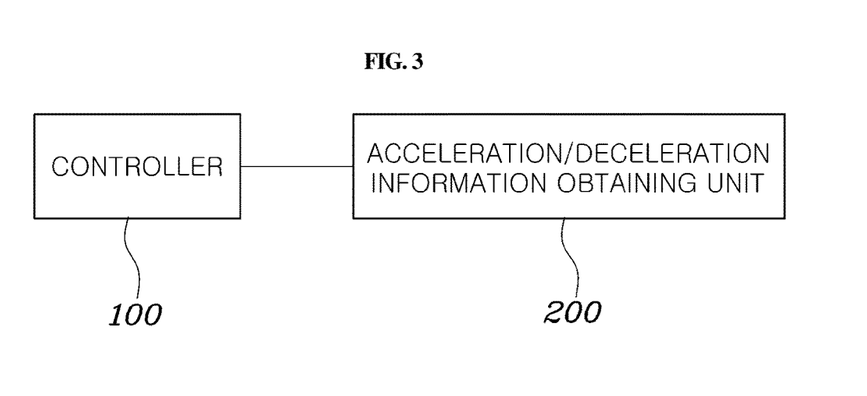
FIG. 3 is a block diagram illustrating a system for controlling a fuel cell vehicle according to one exemplary embodiment of the present invention.

As illustrated in FIG. 3, a system for controlling a fuel cell vehicle according to one exemplary embodiment of the present invention may include an acceleration-and-deceleration information obtaining unit 200 (e.g., a sensor) and a controller 100. The acceleration-and-deceleration information obtaining unit 200 may be configured to obtain or gather acceleration information and deceleration information of a vehicle. The controller 100 may be configured to determine a driving pattern of a driver using the acceleration information or the deceleration information, set conditions for activation of an idling-stop operation using the driving pattern, and stop a fuel cell from generating electric energy when the condition for an idling-stop operation are satisfied. The acceleration-and-deceleration information obtaining unit 200 may be installed within a brake pedal and an accelerator pedal to obtain acceleration information or deceleration information based on an engagement degree of the pedals. Alternatively, the unit may obtain the information using a sensor configured to detect the speed of a vehicle.

Although an exemplary embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A method for controlling a fuel cell vehicle, comprising:
    determining, by a controller, a driving pattern of a driver based on driving information including acceleration and deceleration information;
    setting, by the controller, a condition for activation of an idling-stop of a fuel cell based on the determined driving pattern; and
    stopping, by the controller, the fuel cell from generating electric energy when the condition for activation of the idling-stop is satisfied,
    wherein the determination of the driving pattern includes:
        obtaining, by the controller, an average of speed changes for acceleration driving or deceleration driving;
        comparing, by the controller, the average with a first reference value that is preset and a second reference value that is less than the first reference value; and
        determining, by the controller, that the driving pattern is a first driving pattern when the average is greater than the first reference value, and is a second driving pattern when the average is equal to or less than the first reference value and is greater than the second reference value.

2. The method for controlling a fuel cell vehicle according to claim 1, further comprising:
    determining, by the controller, that the driving pattern is a third driving pattern when the average is equal to or less than the second reference value.

3. The method for controlling a fuel cell vehicle according to claim 1, wherein the determination of the driving pattern includes:
    obtaining, by the controller, the average of absolute values of speed changes for acceleration and deceleration driving;
    comparing, by the controller, the average of the absolute values of the speed changes with the first reference value that is preset by the controller; and
    determining, by the controller, that the driving pattern is the first driving pattern when the average of the absolute values of the speed changes is greater than the first reference value.

4. The method for controlling a fuel cell vehicle according to claim 3, further comprising:
    comparing, by the controller, the average of the absolute values of the speed changes with the first reference value and the second reference value that is less than the first reference value; and
    determining, by the controller, that the driving pattern is the first driving pattern when the average of the absolute values of the speed changes is greater than the first reference value, and is the second driving pattern when the average of the absolute values of the speed changes is equal to or less than the first reference value and is greater than the second reference value.

5. The method for controlling a fuel cell vehicle according to claim 4, further comprising:
    determining, by the controller, that the driving pattern is a third driving pattern when the average of the absolute values of the speed changes is equal to or less than the second reference value.

6. The method for controlling a fuel cell vehicle according to claim 1, further comprising:
    setting, by the controller, a plurality of state of charge (SOC) reference values and a plurality of required torque reference values for a respective driving pattern; and
    setting, by the controller, a condition in which a current SOC of a battery in a vehicle is greater than an SOC reference value for the determined driving pattern and in which a current required torque is less than a required torque reference value for the determined driving pattern, as a condition for activation of an idling-stop.

7. The method for controlling a fuel cell vehicle according to claim 1, further comprising:
    setting, by the controller, a condition for deactivation of the idling-stop using the determined driving pattern; and
    deactivating, by the controller, the idling-stop, thereby causing the fuel cell to generate electric energy when the condition for deactivation of the idling-stop is satisfied.

8. The method for controlling a fuel cell vehicle according to claim 7, further comprising:
    setting, by the controller, a plurality of state of charge (SOC) reference values that correspond to a plurality of driving patterns,
    wherein the controller is configured to set a condition in which a current SOC value of a battery is less than an SOC reference value that correspond to the determined driving pattern, as the condition for deactivation of the idling-stop.

9. The method for controlling a fuel cell vehicle according to claim 7, further comprising:
   setting, by the controller, a plurality of required torque reference values that correspond to a plurality of driving patterns,
   wherein the controller is configured to set a condition in which a current required torque of a vehicle is greater than a required torque reference value that correspond to the determined driving pattern, as the condition for deactivation of the idling-stop.

10. The method for controlling a fuel cell vehicle according to claim 1, further comprising:
    storing, by the controller, in a memory unit the determined driving pattern at the time of turning off an engine;
    recognizing, by the controller, a restart of a vehicle by determining the driving pattern using driving information including acceleration information or deceleration information of the vehicle after an engine of the vehicle is turned off, then the engine of the vehicle is restarted, and the vehicle moves for a predetermined period of time; and
    setting a restart by setting, by the controller, a condition for activation of the idling-stop of the vehicle, based on the driving pattern stored in the memory unit when the controller fails to determine the driving pattern in the recognition of the restart.

11. The method for controlling a fuel cell vehicle according to claim 10, further comprising:
    deleting, by the controller, the driving pattern stored in the memory unit through the storing of the driving pattern when the controller completes determination of the driving pattern,
    wherein in the setting of the restart, the controller is configured to set the condition for activation of the idling-stop using the determined driving pattern in the recognition of the restart.

12. A system for controlling a fuel cell vehicle, comprising:
    an acceleration-and-deceleration information acquisition unit configured to acquire acceleration information and deceleration information of a vehicle; and
    a controller configured to determine a driving of a driver pattern using the acquired acceleration information and deceleration information, set a condition for activation of an idling-stop of a fuel cell using the determined driving pattern, and stop a fuel cell from generating power when the condition for activation of the idling-stop is satisfied,
    wherein the controller is further configured to:
       obtain an average of speed changes for acceleration driving or deceleration driving;
       compare the average with a first reference value that is preset and a second reference value that is less than the first reference value; and
       determine that the driving pattern is a first driving pattern when the average is greater than the first reference value, and is a second driving pattern when the average is equal to or less than the first reference value and is greater than the second reference value.

13. The system for controlling a fuel cell vehicle of claim 12, wherein the controller is further configured to:
    determine that the driving pattern is a third driving pattern when the average is equal to or less than the second reference value.

14. The system for controlling a fuel cell vehicle of claim 12, wherein the controller is further configured to:
    obtain the average of absolute values of speed changes for acceleration and deceleration driving;
    compare the average of the absolute values of the speed changes with the first reference value that is preset by the controller; and
    determine that the driving pattern is the first driving pattern when the average of the absolute values of the speed changes is greater than the first reference value.

* * * * *